(12) United States Patent
Collum et al.

(10) Patent No.: US 7,697,689 B2
(45) Date of Patent: Apr. 13, 2010

(54) SECURE TRANSMISSION SYSTEM FOR A DIGITAL TRUNKED RADIO SYSTEM

(75) Inventors: James F. Collum, Forest, VA (US); William Oscar Janky, Goode, VA (US); Eugene H. Peterson, III, Forest, VA (US); Dennis Maddox, Rustburg, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 636 days.

(21) Appl. No.: 11/714,030

(22) Filed: Mar. 5, 2007

(65) Prior Publication Data
US 2007/0160214 A1    Jul. 12, 2007

Related U.S. Application Data

(62) Division of application No. 10/173,485, filed on Jun. 17, 2002, now Pat. No. 7,203,318.

(51) Int. Cl.
   *H04M 1/66*   (2006.01)
   *H04M 1/68*   (2006.01)
   *H04K 1/00*   (2006.01)
   *H04L 9/00*   (2006.01)

(52) U.S. Cl. .................. 380/270; 455/410; 455/411
(58) Field of Classification Search .................. 380/270
   See application file for complete search history.

(56) References Cited

U.S. PATENT DOCUMENTS

| 4,905,302 | A | 2/1990 | Childress et al. |
| 4,920,567 | A | 4/1990 | Malek |
| 5,185,796 | A | 2/1993 | Wilson |
| 5,185,797 | A | 2/1993 | Barrett et al. |
| 5,502,767 | A | 3/1996 | Sasuta et al. |
| 5,953,671 | A | 9/1999 | Childress |
| 5,956,648 | A | 9/1999 | Brennan et al. |
| 6,047,160 | A | 4/2000 | Priest et al. |
| 2002/0181708 | A1 | 12/2002 | Seo et al. |

OTHER PUBLICATIONS

Gourgue, Frederic, "Air Interface of the Future European Fully Digital Trunk Radio System", 1993, IEEE, pp. 714-717.
Annunziato, et al., "TETRA radio performance evaluated via the software package" TETRAISM, 2000, Baltzer Science Publishers, pp. 17-26.
Engerman et al., "Effective Use of Wireless Data Communications", 1998, International Journal of Network Management, vol. 8, pp. 2-11.

*Primary Examiner*—Matthew B Smithers
(74) *Attorney, Agent, or Firm*—Darby & Darby PC; Robert J. Sacco

(57) ABSTRACT

A security system for a digital trunked radio system having a digital control channel and a plurality of working channels, wherein said working channels are assigned for temporary use of individual radio units by digital control signals transmitted over said control channel, said control channel carrying digital control signals between a base site and said radio units, comprising a digital key, said key used to limit access to the system equipment and system control channel transmissions.

8 Claims, 4 Drawing Sheets

SECURE TRANSMISSION SYSTEM FOR A DIGITAL TRUNKED RADIO SYSTEM

This application is a divisional of U.S. patent application Ser. No. 10/173,485 entitled "Secure Transmission System for a Digital Trunked Radio System" filed Jun. 17, 2002 now U.S. Pat. No. 7,203,318, which is hereby incorporated by reference in its entirety.

FIELD OF THE INVENTION

The present invention relates, in general, to digital trunked radio systems, and more specifically to a security system for a digital trunked radio system.

BACKGROUND OF THE INVENTION

Trunked digital radio communication systems are commonly used by public service organizations, such as police, fire, and ambulance squads, and by many private organizations to communicate with each other. Trunked digital radio systems provide an efficient means to communicate between single users and/or groups of users. They allow for one call to be made to many users simultaneously, such as a police dispatcher sending out a call to all officers at once. Any officer receiving the call has the ability to respond to the dispatcher, as well as to all other officers using the system. This makes these type of communication systems well suited for public safety and municipal applications.

Digital trunked radio systems comprise a plurality of radios that communicate with each other via a base station. An illustration of one example of a digital trunked radio system is shown in FIG. 1. FIG. 1 illustrates a system with one base station; however, a system can contain several base stations networked together over a wide geographic area, with each station known as a site. On large systems, each radio communicates with a site within its range of transmission, and switches between sites when the radio travels throughout the geographic area covered by the system.

Digital trunked radio systems operate by allowing a user to transfer a voice call (or data call) to another user or group of users on the system. The information is transferred on one of a plurality of channels, referred to as working channels. A control channel assigns a working channel to every transmission, and notifies both the transmitting radio and all receiving radios of the working channel assignment. When the transmission is completed, the assigned working channel is released, and thus becomes available for a new transmission.

Because each transmission within a single conversation could theoretically be sent on a different working channel, it was difficult for individuals outside of the system to "eavesdrop" on the users of the system using commercially available scanners. Preventing eavesdropping is an area of concern for many municipalities using digital trunked radio systems, as it is obviously critical that crucial communications between personnel (e.g., police officers) are not intercepted by individuals who are not authorized to receive them. Clearly, police officers do not wish for transmission regarding their location to be intercepted by the very individuals they might be pursuing.

As scanner technology has advanced, sophisticated scanners were developed that could keep up with the channel switching that occurs on digital trunked radio systems. These sophisticated scanners are able to understand the control channel communications and, as a result, can follow conversations as the transmissions switch from one working channel to another.

Existing systems have used various techniques to defeat the newer, sophisticated scanners, with varying levels of success. The Enhanced Digital Access Communications System (EDACS), produced and sold by M/A-COM Private Radio Systems, Inc. (Lynchburg, Va.), employs a tone-drop technique to make the calls more difficult to follow. This technique transmits a tone following a transmission on a working channel. The scanner remains locked on the tone, while the radio itself recognizes the tone and releases the working channel. However, while this technique worked for less sophisticated scanners, highly sophisticated scanners could also recognize the tone sequence and drop the working channel.

Another alternative is to use encryption devices to encode and decode each transmission (voice or data) such that the users of scanners would not be able to understand the communication, even if the scanner could follow the channel switching. This also has some drawbacks. First, encryption requires the use of fairly complex encryption algorithms to encode the transmissions, which then need to be decoded upon receipt. This requires additional hardware to be added at the base station and on each radio, or alternatively, requires the use of encoding and decoding encryption software. This is an expensive solution. In addition, each message must be encoded and decode, which further causes a strain on the system time constraints.

Another concern has developed over the years that digital trunked radio systems have been in operation. Radios that formerly were part of digital trunked radio systems and have been lost or stolen over the years have been appearing for sale at places such as Ebay (www.ebay.com). Radio hackers purchase these radios and program them to intercept transmissions on systems being used today. In addition, information regarding the system to which these "pirate" radios belonged can be read from the radios, such as the RF frequencies on which the system operates. This type of information makes it easier for unauthorized access to the communications, and thus adds another security concern in addition to the advancement of scanner technology.

Furthermore, as systems such as EDACS expand to include more sites and a wider geographic area, more personnel are required to maintain and administer the system. Unauthorized access to site data by individuals other than the proper administrators is another means by which system information can be obtained by unauthorized parties.

It is desired to prevent unauthorized individuals from accessing the radio system, either by intercepting transmissions or by obtaining the system information directly from a radio or from site equipment. What is desired is a simple, cost-effective security system that provides the required level of security in all facets of the system, including over the air transmissions and radio or system site access.

SUMMARY OF THE INVENTION

The present invention provides a complete security system for a digital trunked radio system. In accordance with the present invention, a digital system security key (SSK) is provided to both site base stations and individual radios. The key provides security to the system by performing two functions.

First, the SSK is used to perform a simple encryption of the control channel transmissions. By encrypting the control channel, the need to use encryption techniques on each working channel transmission is eliminated. Scanners and unauthorized radios are unable to understand the working channel assignments sent on the control channel, and thus are unable to track the un-encrypted transmissions as they switch through a plurality of different working channels.

The control channel transmissions are secured by using a mask created from the SSK. The SSK is a 16 bit binary word known to the base station and all of the radios on the system. A digital mask is created by combining the SSK with a fixed bit pattern. The control channel transmission is combined with the mask on transmission by using a simple exclusive-or process (XOR) to form a simplistic encoded transmission. The receiving radios perform the same process with the same mask to decode the transmission.

In a preferred embodiment, only the outbound transmissions (those sent from the base station to the radios) are encrypted using the mask formed from the SSK. Inbound transmissions (those originating from the radios and being sent to the base station) remain the same as the transmissions used in the prior art. For applications that require a higher level of security, an alternate embodiment can apply the mask to both inbound and outbound transmissions.

In a preferred embodiment of the present invention, the SSK can be programmed into each radio unit individually, or alternatively, the SSK can be manually programmed solely into the site base station and transmitted over the air to the radios.

The second security function provided by the SSK is to provide a means to prevent access to a system by unauthorized individuals, while allowing authorized system administrators to gain entry to the system. In accordance with the present invention, the SSK is stored on a smart card. An individual attempting to log onto the system would need to swipe the card using a card reader attached to the site base station or radio unit. The key on the smart card is checked to see if it matches the key loaded on the system equipment. If it does, the individual can gain access to the administrative functions. If it does not, access is denied.

The SSK is encrypted before being placed on a smart card or on the system units. This provides added security by making it less prone to interception by unauthorized radios in the event the key is distributed via transmission over the air.

DETAILED DESCRIPTION OF THE INVENTION

Figure 1:
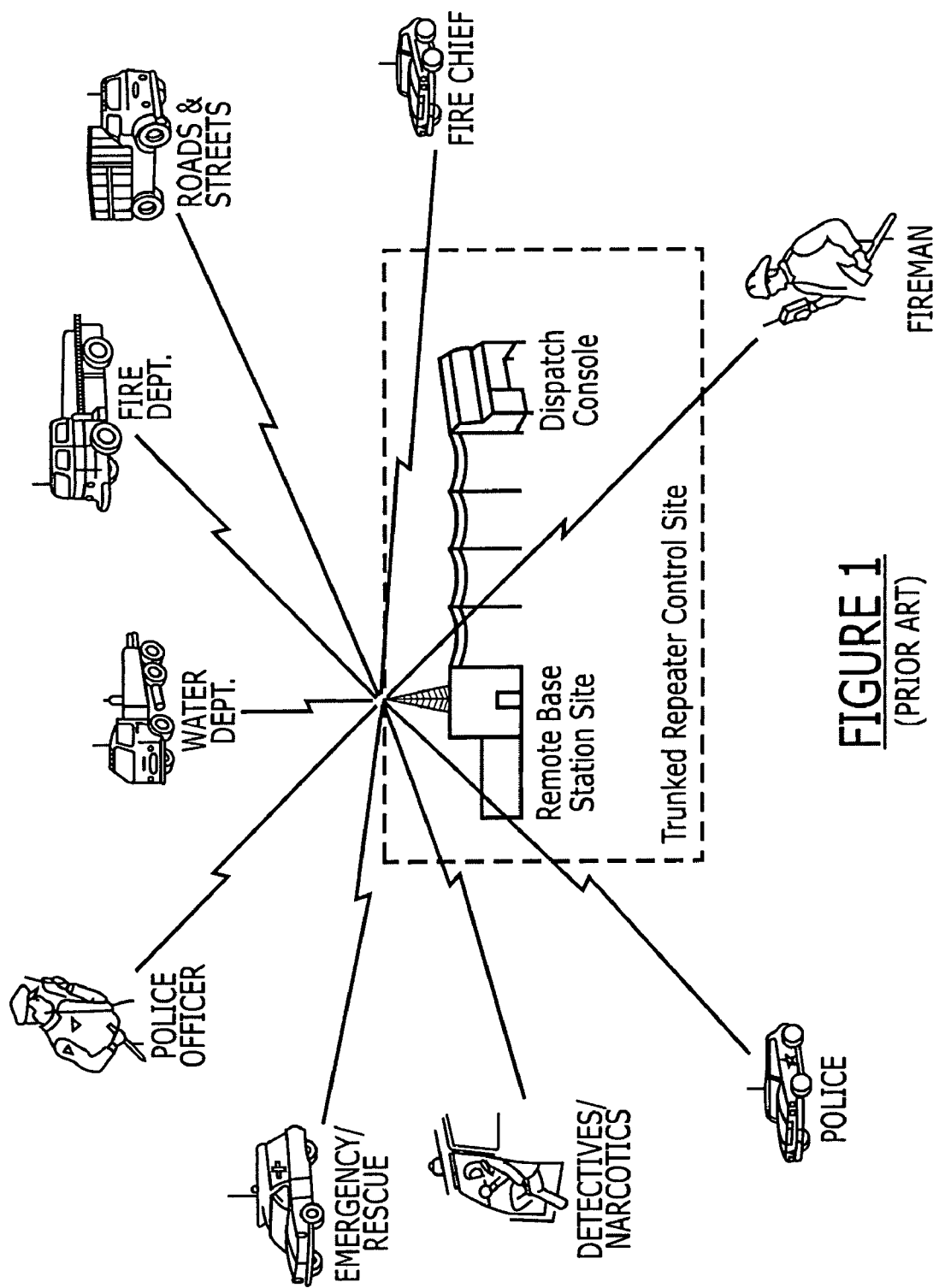
FIG. 1 is an illustration of a digital trunked radio system, such as EDACS, in accordance with the prior art.

The preferred embodiment of the present invention provides a method to scramble or encrypt digital transmission on the control channel of a digital trunked radio system by using a system security key (SSK). For sake of example, the following description shall be set forth in connection with an EDACS radio system. However, it should be understood that the same technique can be applied to other digital trunked radio communication systems.

The EDACS system, like all digital trunked radio communication systems, uses a plurality of working channels for voice and data communication, and a control channel for system management purposes (e.g., working channel assignment, radio identifier information, group identifier information). The techniques of the present invention are applied to transmissions solely on the control channel. Transmissions on the control channel can be classified into two distinct types according to direction with respect to the origination point of the transmission. For the purposes of this discussion, control channel transmissions from a site on the system (e.g., base station, repeater site) to one or more radios shall be referred to as "outbound" transmissions. Control channel transmissions from an individual radio to a system site shall be referred to as "inbound" transmissions. The embodiment described herein applies the techniques of the present invention only to outbound transmissions on the control channel; however, alternate embodiments include using the SSK to encrypt both the outbound and inbound transmissions.

The SSK is a digital code word or key that is programmed into both the transmitting and receiving radio units. The SSK in the preferred embodiment comprises a sixteen bit binary word. A sixteen bit SSK allows for $2^{16}$ or 65536 distinct key possibilities. Alternate embodiments could use any number of bits ranging from 1 to 28 (the number of bits contained in an outbound message in the EDACS protocol). If fewer bits are used, the number of possibilities for the SSK is reduced; thus, the system is less secure. Additional bits add security, but there is a tradeoff in that the encoding becomes more complex as a result of having to process more bits.

The sixteen bit SSK in the preferred embodiment is created by entering the desired key into a Key Entry Device (KED). The key entry device is a computer (e.g., PC, laptop, PDA) containing a serial output port. In the preferred embodiment, the desired SSK is entered into the KED and downloaded to a smart card (a card with a magnetic carrier, e.g., credit cards) using well-known methods. The smart card can be used to enter the SSK directly into each radio one at a time; however, it is more feasible to use a smart card to enter the SSK into the site equipment, and then to transmit the SSK over a working channel to the individual radios.

To ensure secure transmission of the SSK to the radio units, the KED is equipped with an encryption algorithm. Prior to placing the SSK on the smart card, the SSK is encrypted. The resulting digital word is referred to as the encrypted System Security Key (eSSK). Any type of encryption algorithm can be used to develop the eSSK, and such algorithms are well known in the art. The SSK is then transferred in eSSK form to the site equipment directly using the smart card and to the radios using the smart card or by sending the eSSK over the air.

Figures 2, 3:
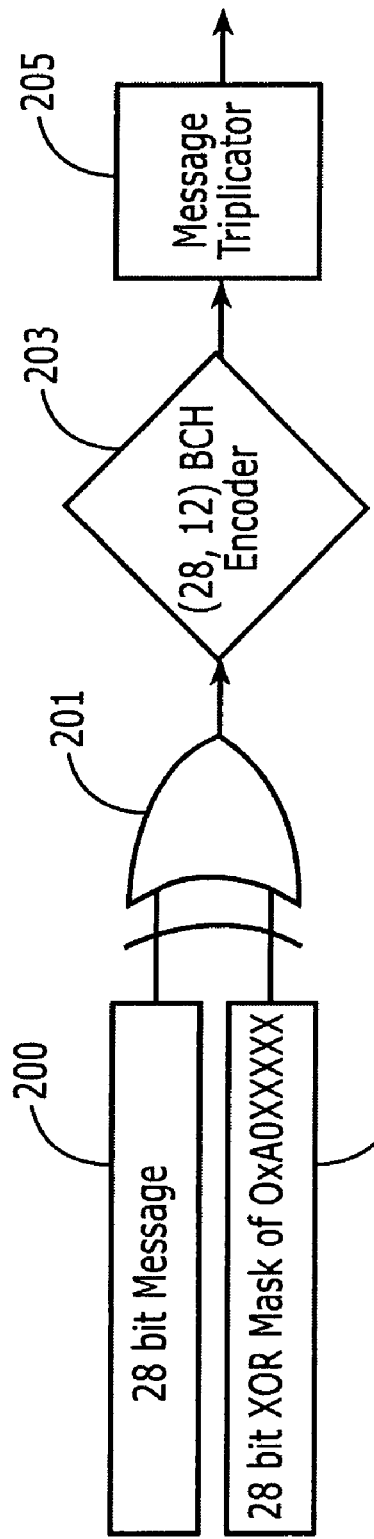
FIG. 2 is an example of the format of a digital mask created using an SSK in accordance with the present invention.
FIG. 3 is a logic diagram of the process performed on the control channel transmissions in accordance with the present invention.

In the preferred embodiment, the resulting SSK is used to create a digital mask for scrambling outbound control channel transmissions upon transmission (in the case of a site) or unscrambling outbound control transmissions upon receipt (in the case of a radio on the system). FIG. 2 illustrates the process by which the messages are scrambled. Outbound messages on an EDACS system comprise a total of forty bits. The first twenty-eight bits are used to form the informational part of the message 200. An exclusive-or (XOR) process 201 is applied to the twenty-eight bits comprising the informational part using a twenty-eight bit mask 202 created from the SSK.

The XOR function has a desired property in that a binary code that is combined using the XOR process to a constant binary value twice will always yield the original bit value. For example, a bit with the value of one can be processed with an XOR with a mask value of one, yielding a resulting scrambled value of zero. Upon receipt by a radio, the scrambled zero is then processed with an XOR function a second time using the same mask value of one. This second process will combine the scrambled value of zero with the mask value of one and result in a value of one, which is the original bit value.

The mask 202 is created by combining the encrypted SSK, or eSSK, with a fixed bit pattern. The eSSK is sixteen bits in length. These sixteen bits are combined with a fixed bit pattern of twelve bits to create a twenty-eight bit XOR mask 202. An example of the mask 202 is illustrated in FIG. 3. The fixed portion of the mask resides in bits five and seventeen to twenty-seven. Bit five is held constant to keep the key illustrated compatible with certain existing radios on some EDACS systems that require bit five to be zero; however, alternate embodiments could vary the location of the fixed portion. Alternate embodiments also include using greater or fewer bits for the variable portion, and a corresponding inverse adjustment to the fixed portion. The variable portion of the mask is contained in bits zero through four and six through sixteen. It is the variable portion of the mask that is changed when a new SSK is selected, or when the more secure dynamic security technique is employed, as further discussed below.

Following the XOR process 201 between the 28 bit message 200 and the mask 202, a BCH forward error correction code 203 is applied to the twenty-eight bit encoded informational message to result in a message length of forty bits, as known in the art.

The resulting forty bit message is then triplicated using a message triplicator 205 (implemented with either software or hardware) and transmitted. The transmission protocol of EDACS requires messages to be sent in triplicate for reliability; however, this process is not material to the present invention and thus is not further discussed herein. When this message is received by the radio, the forty bit message is decoded with a (28,12) BCH decoder. The scrambled bit message is then subjected to the XOR function using the SSK to result in the original digital message.

Two types of message scrambling can be obtained using the SSK. The first type is a static scrambling process. It is the simpler (and thus easier to implement) of the two types, and as such is the preferred embodiment for systems that do not require a higher level of security. The static method uses the same digital mask (created by combining the SSK with the fixed pattern) for all transmissions. The mask can always be changed by the administrator of the system if there is a concern that security may have been breached; however, unless a new SSK is chosen, the mask used to scramble the control channel transmissions remains the same.

The second type of scrambling is dynamic scrambling. In this embodiment, the mask is modified at set intervals, such as after each transmission. The encryption algorithm used to determine the initial SSK is applied to the current mask at each predetermined interval. This increases the security level of the system, as the digital mask is constantly changing, making it much more difficult for an unauthorized user to unscramble the control channel transmissions. However, this also increased the complexity of the software required on the site equipment and the radios, as synchronization of the mask needs to be maintained between the transmitting equipment and the receiving equipment. Both units must necessarily change the mask at the same time, or the system will breakdown.

The second function of the SSK is to provide access control to the radio system. In the prior art, an individual could determine information about the system (e.g., frequencies, group assignments) by reading system data from a radio. The SSK (in encrypted, or eSSK form) is used to limit access to the system information stored in a radio terminal to only authorized personnel. In order to access the system information stored in a radio, the radio needs to be again connected to the KED, which, in the preferred embodiment, is a card reader device. A smart card (e.g., a card with a magnetic information strip contained on it, similar to a credit card) that contains an eSSK that matches the eSSK programmed into the radio is needed to access the system data stored on the radio.

Figure 4:
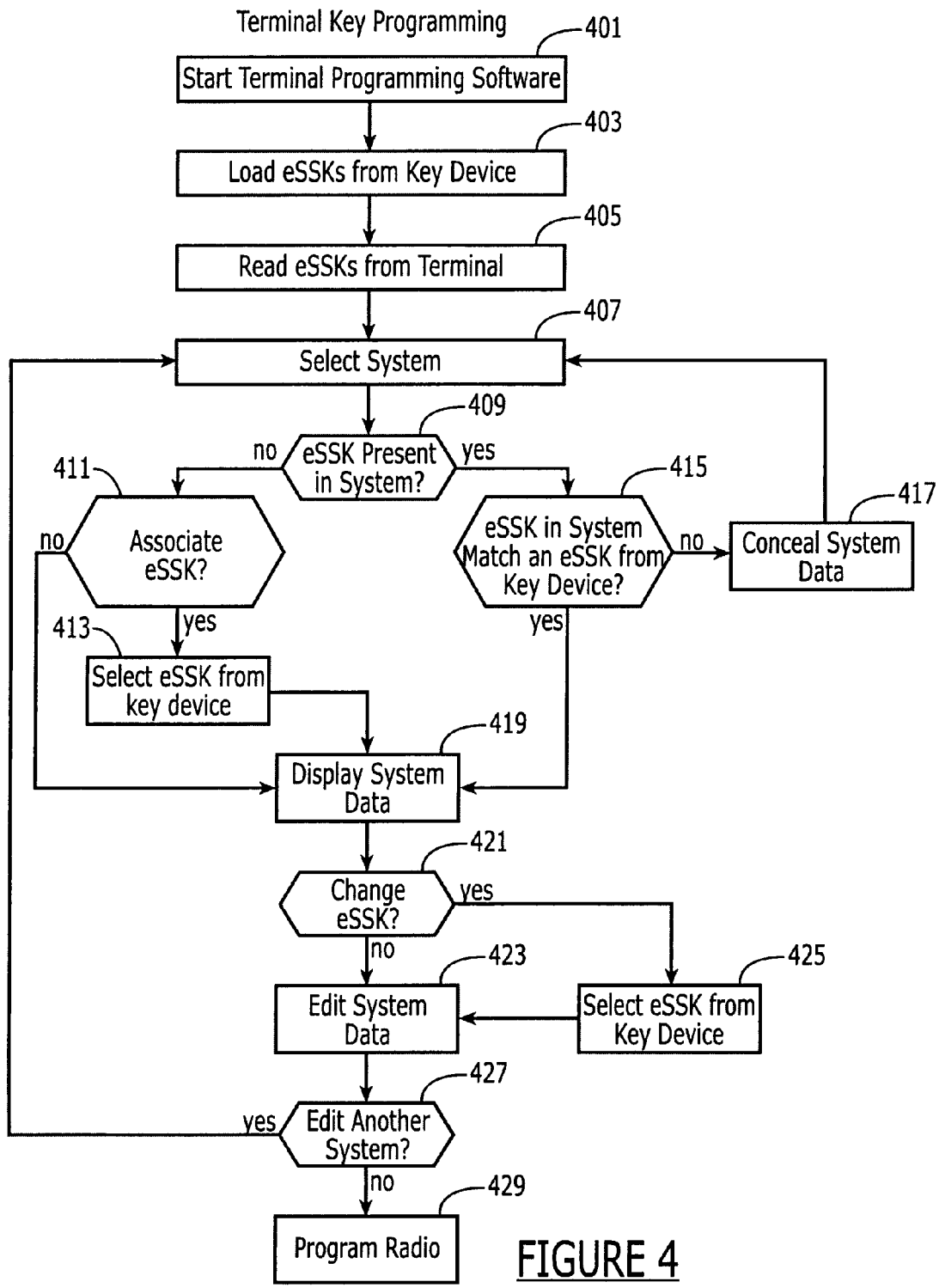
FIG. 4 is a flow chart of the process by which the key provides security against unauthorized users obtaining data from a radio terminal.

FIG. 4 is a flow chart illustrating the steps for accessing system data contained on a radio. The individual radio units are programmed using terminal programming software, which is located on a computer attached to the radio via a serial port, or alternatively is located on the radio itself. Once this software is started (step 401), it performs a comparison of the eSSK presently loaded into the radio with the eSSK on the smart card. The software loads the eSSK from the smart cart (step 403) and the eSSK from the radio (step 405). As some radios are capable of operating on several different EDACS systems (i.e., various site locations), a particular system is chosen (step 407). Next, a check is performed to determine if the system selected has an eSSK currently on it (step 409). If it does not, the user may install the eSSK from the card onto the system (step 411). This requires the user to select an eSSK from the card (step 413) to be entered into the radio. If it does, the eSSK in the system is checked against the eSSK on the smart card (step 415). If the two digital keys do not match, access to the system data is denied (step 417) If they match, the user is allowed access into the system data (Step 419). The user can change the eSSK at this point if desired (step 421) by selecting a new eSSK from the smart card (step 425), or the user can edit any of the other system data (step 423). For radios programmed to operate on more than one system, the user has the option to repeat the entire process to edit a different system (step 427). Once all of the system data is edited as desired, the edited data is programmed into the radio terminal (step 429).

Figure 5:
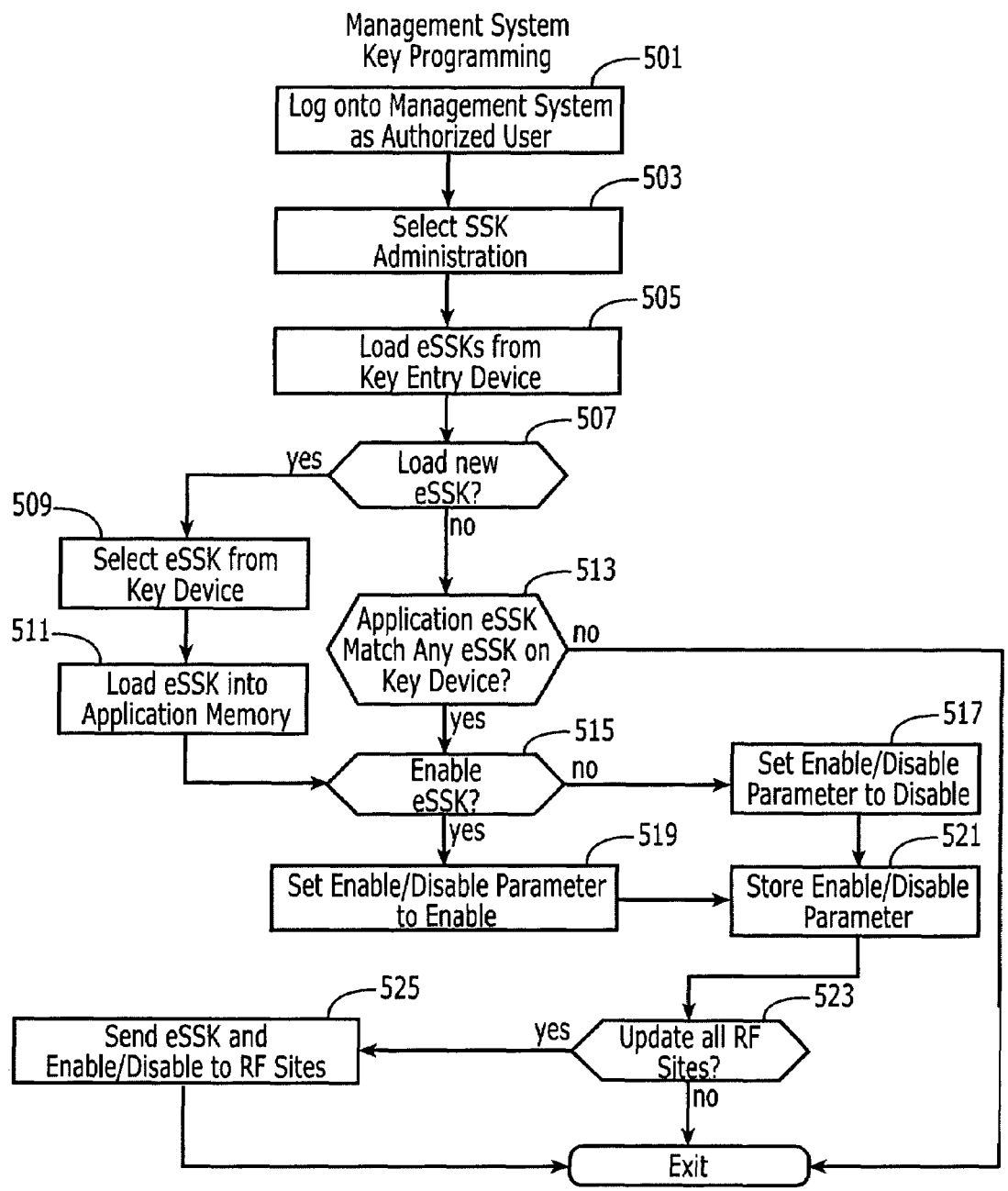
FIG. 5 is a flow chart of the process by which the key provides security against unauthorized users accessing the system management functions.

The same type of security function is performed on the system management side using the smart card programmed with an eSSK. FIG. 5 is a flow chart illustrating the steps necessary to access system data at the location of the system management terminal, usually found at a base station or site location. Systems enabled with the SSK feature can operate in SSK mode or standard mode. As discussed above, the ability to turn off the SSK feature allows non-SSK enabled systems to operate in cooperation with SSK enabled systems when desired. The correct eSSK on a smart card is necessary for a user to log onto the management system and disable the SSK mode. A user logs onto the management system (step 501), chooses the SSK administration function (step 503), and then is required to enter an eSSK using the smart card (step 505). If the key on the card matches the eSSK in the system (step 513), the user has access to enable (steps 515 and 519) or disable (step 517) the SSK mode. This enable/disable parameter is stored on the system (step 521). A choice is then made whether this information should be sent to all RF sites on the system (step 523), and if desired, the updated information is sent out (step 525).

In the preferred embodiment, however, an emergency access feature exists. This feature allows a user who has a valid smart card that does not contain the matching eSSK to turn off the eSSK in an emergency situation. This is done by loading a new eSSK on the system (step 507) by choosing an eSSK from the smart card (step 509) and loading the new eSSK into the application memory as the new system eSSK (step 511). The user can choose whether to enable the new key (step 519) or disable the new key (step 517), with the selection being stored (step 521). The purpose of this feature is to allow an administrator to be able to access the system and edit the SSK mode in an emergency without a smart card containing the matching key by installing a new key from another valid smart card. By installing the new key, the administrator can bypass the key matching process (step 513). However, to do so still requires a valid smart card, so security is not unreasonably compromised, but at the same time provides a means for users with valid smart cards to bypass this layer of system security in the event that no matching smart cards are available.

The use of the system security key provides an efficient, complete security system for a digital trunked radio system. Security is obtained against individuals attempting to eavesdrop on transmissions using scanners and pirate radios. The system also prevents system data from being read from radio units, or from the system site. All of these features are accomplished through the use of a simple and cost-effective method of using a digital key. In light of the ever increasing security concerns present in the world today, the present invention provides a significant improvement to the non-secure systems of the prior art.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A method for providing secure access of a user to system data stored on a terminal within a digital trunked radio system, said method comprising the steps of:
   1—storing a first digital key on said terminal;
   2—requiring a user to present a second digital key upon a request for access to said system data; and
   3—comparing said first key and said second key, wherein access is permitted if said first key and said second key match.

2. The method as set forth in claim 1, wherein said second key presented in step 2 is contained on a smart card.

3. The method as set forth in claim 1, wherein said terminal is an individual radio unit.

4. The method as set forth in claim 1, wherein said terminal is a site management terminal.

5. The method as set forth in claim 1, wherein step 3 further comprises the steps of:
   3.1—allowing a third digital key to be read from said smart card and stored on said terminal, wherein said third key replaces said first key;
   3.2—permitting access to system data after replacing said first key with said third key.

6. An apparatus for limiting access of a user to system data stored on a terminal within a digital trunked radio system, said system comprising:
   a smart card, said smart card containing a first digital key;
   a terminal, said terminal containing:
      a second digital key,
      a circuit for reading said first digital key from said smart card,
      and a circuit for comparing said first digital key with said second digital key,
   wherein access to said system data stored on said terminal is allowed only if said first key and said second keys match.

7. An apparatus as set forth in claim 6, wherein said terminal is a radio unit.

8. An apparatus as set forth in claim 6, wherein said terminal is a site station.

* * * * *